INVENTORS
HENRI GUTTON,
ANTOINE JEAN ORTUSI,
BY
ATTORNEY

Patented Oct. 30, 1951

2,573,012

UNITED STATES PATENT OFFICE 2,573,012

RETARDATION GUIDE ON DECIMETRIC WAVES

Henri Gutton and Antoine Jean Ortusi, Paris, France, assignors to Compagnie Generale de Telegraphie Sans Fil, a corporation of France Application April 7, 1947, Serial No. 739,967
In France April 27, 1944

Section 1, Public Law 690, August 8, 1946
Patent expires April 27, 1964

3 Claims. (Cl. 178—44)

This invention relates to retardation guides for decimetric waves.

In numerous applications, it is often useful to provide an apparatus, which, upon receiving at the entry a modulated incident wave, delivers as output a wave modulated in the same manner, but with a certain delay. The retardation line is the means of solving this problem in the case of relatively long waves, but it is not a satisfactory solution if the waves become too short, for instance in the case of decimetric waves.

The present invention has for its object the provision of various types of retardation guides operating especially on decimetric waves.

Our invention will be more clearly understood from the specification hereinafter following by reference to the accompanying drawings, in which.

Figures 1, 2, 3, 4, 5:
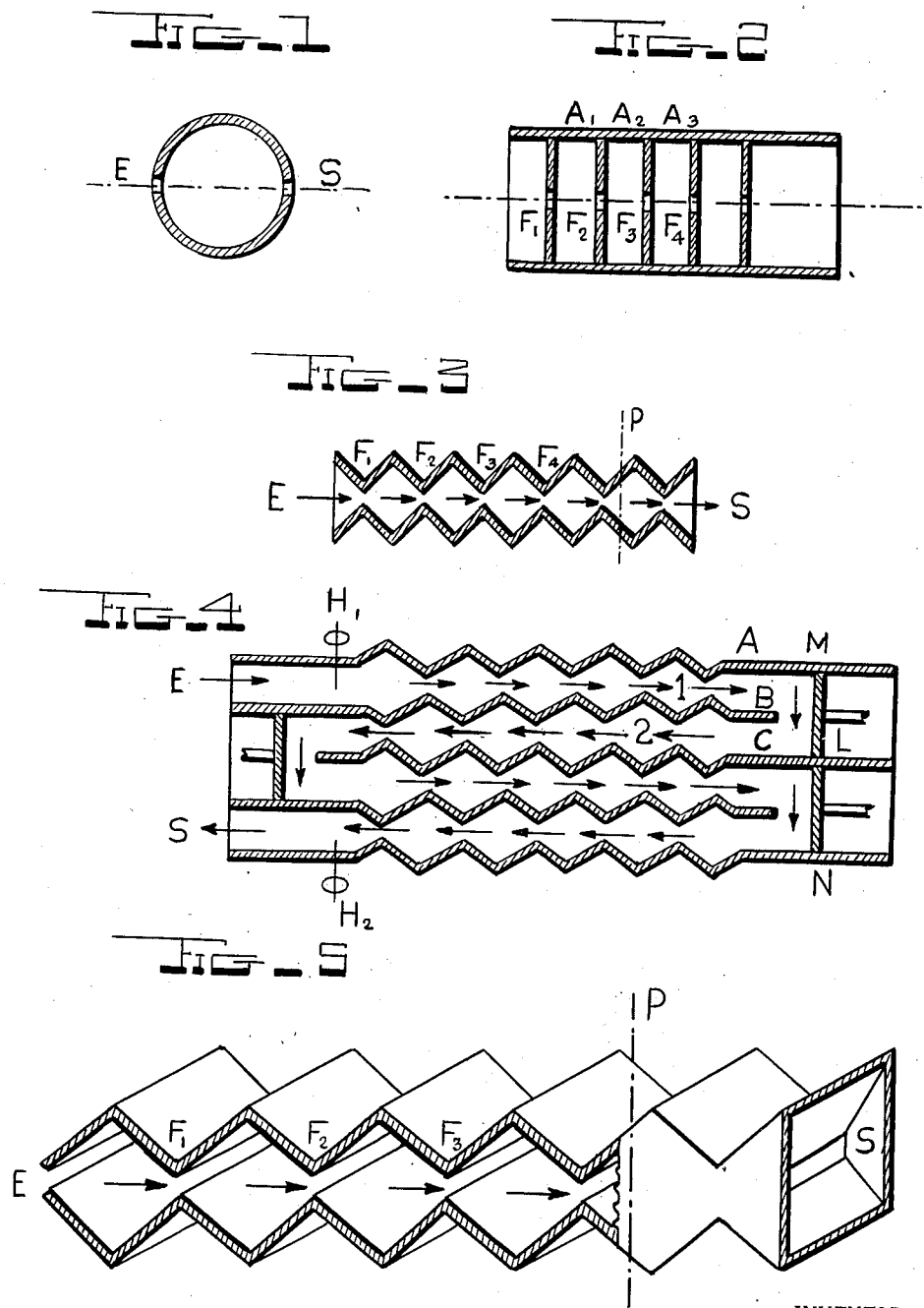
Figure 1 is a diagrammatic representation of a closed symmetric resonator.
Fig. 2 is a diagrammatic illustration of a multiple assembly of symmetric resonators.
Fig. 3 is a sectional view of a wave guide constructed in accordance with our invention.
Fig. 4 is a theoretical diagram explaining the principles of operation of our invention.
Fig. 5 is a perspective view of the wave guide shown in Fig. 3.

The principle is as follows:

A closed symmetric resonator, such as the one illustrated in section in Fig. 1 possesses an entry opening E through which the wave is introduced, and an exit opening S through which the incident wave goes out; at the resonance frequency, such as a resonator has a transmission coefficient which is very near to unity, and the phase of the wave between entry and exit varies by $\pi$; furthermore, the dimensions of the resonator may be much inferior to half the length of the wave that traverses it. According to the invention, if there is constituted a chain of such resonators, one obtains an important delay, under a small volume.

The system thus formed by the association of these resonators constitutes also a filter, and the greater the quality factor of every resonator, the sharper is this filter. As this quality factor depends upon the dimension of the entry and exit apertures, it is necessary to determine the same for a given application in such manner that the whole retardation guide should have a sufficient passing band for letting through the carrier frequency and its side bands.

According to a modification of the invention, it is possible to construct a retardation guide that transmits a magnetic wave of the $H_{01}$ type, in the form of a guide having a rectangular section, one side of which is greater that a half wave length, the other side being of reduced dimension. If the electric vector of the wave be polarized parallel to the smaller side of the guide and if there be disposed in the same, perpendicularly to the electric vector a series of equal and equidistant slots, the guide will allow the passage of a frequency band corresponding to the resonance of every elementary resonator constituted by the lateral walls of the guide and by the planes of two consecutive slots. The assembly, of which Fig. 2 shows diagrammatically a section perpendicular to the slots $F_1$, $F_2$, $F_3$, ... forms thus a retardation guide which is tuned to the resonance frequency of the intermediary resonators, every one of them subjecting the wave to a retardation of $\pi$. The intervals $A_1$, $A_2$, $A_3$ between the successive slots being much smaller that the half wave length $\lambda_2$ it is possible to obtain great retardations with a small bulk.

Another variant, of an easier construction, consists in utilizing a guide of rectangular section which is variable (referring to the plane perpendicular to the direction of propagation of the wave) and showing successive slots formed by regular stringencies of the two opposed walls of the guide. Fig. 3 shows this device in section the view being taken perpendicularly to the successive slots $F_1$, $F_2$, $F_3$ ... a section of the guide on any given plane P perpendicular to the line "entry-exit," ES, being a rectangle. Fig. 5 shows a perspective view of the wave guide shown in Fig. 3.

The foregoing variant permits especially of lengthening the retardation guide through the juxtaposition of several portions, as shown in Fig. 4 in section; thus one obtains great delays at the cost of little expense of material and with a reduced bulk. However, it is necessary, for the wave passing from one portion to the next, to provide a matching device that permits of avoiding the reflection of the wave at the end of the portion. To this end, it is possible, for instance, to dimension the terminal resonators of the successive portions by adapting them at the middle of one of the sides in such manner that the terminal section AB of the first portion (Fig. 4) is equal to the section BC of the second portion connected thereto, and so on. Moreover, the junction element AMLC which is terminated at 1 and 2 on two identical obstacles, must have such a length that it is tuned to the mutual frequency of the two portions which it serves to connect; this length may be adjusted by displacing, for instance parallel to itself, the bottom MN of the junctions, by any known means such as a piston for example.

Furthermore, for avoiding reflections at the entry and the exit of the retardation guide, there will be disposed two identical devices $H_1$ and $H_2$ shown more clearly in Fig. 4, correcting the reflection, $H_1$ and $H_2$ being known regulating means, such as adjustable shunt reactors for example, enabling a variation of the resonance frequency of a cavity resonator.

It is well understood that the particular embodiments described do not exhaust the possibilities of finding other forms of retardation guides within the limits of the present invention, which naturally includes every guide made up of a succession of resonators of any form whatever which are tuned to the frequency to be transmitted, and which serve as a retardation guide proper or as a filter.

What we claim is:

1. A guide for electromagnetic waves comprising a metal envelope having two substantially parallel opposite faces and two opposite faces alternatingly divergent and convergent with each other so as to divide the guide into several substantially identical cells which are substantially tuned to a common resonance frequency and communicate with each other through narrow passages forming irises, and regulating means arranged in the first and last cells of the guide to permit tuning of these terminal cells on the same resonance frequency as that of the intermediate cells.

2. A guide for electromagnetic waves comprising an arrangement of several guide sections formed by a metal envelope having two substantially parallel opposite faces and two opposite faces alternatingly divergent and convergent with each other so as to divide the guide into several substantially identical cells which are substantially tuned to a common resonance frequency and communicate with each other through narrow passages forming irises, the said sections being arranged in a serpentine path and the ends of the juxtaposed sections being connected one to another by closed communicating chambers and regulating means arranged in the communicating chambers and enabling a tuning of these chambers on the same resonance frequency as that of the intermediate cells.

3. A guide for electromagnetic waves comprising an arrangement of several guide sections formed by a metal envelope having two substantially parallel opposite faces and two opposite faces alternatingly divergent and convergent with each other so as to divide the guide into several substantially identical cells which are substantially tuned to a common resonance frequency and communicate with each other through narrow passages forming irises, the said sections being arranged in a serpentine path and the ends of the juxtaposed sections being connected one to another by closed communicating chambers, regulating means arranged in the communicating chambers and enabling a tuning of these chambers on the same resonance frequency as that of the intermediate cells and separate regulating means arranged in the first and last cells of the serpentine path, the said means enabling a tuning of the said terminal cells on the same resonance frequency as that of the intermediate cells.

HENRI GUTTON.
ANTOINE JEAN ORTUSI.

REFERENCES CITED

The following references are of record in the file of this patent:

UNITED STATES PATENTS

| Number | Name | Date |
|---|---|---|
| 2,396,044 | Fox | Mar. 5, 1946 |
| 2,432,093 | Fox | Dec. 9, 1947 |

FOREIGN PATENTS

| Number | Country | Date |
|---|---|---|
| 77,082 | Sweden | Nov. 29, 1930 |
| 877,692 | France | Dec. 14, 1942 |